No. 713,117. Patented Nov. 11, 1902.
G. S. LEE.
HOSE PIPE CONNECTION.
(Application filed Aug. 10, 1901.)
(No Model.)
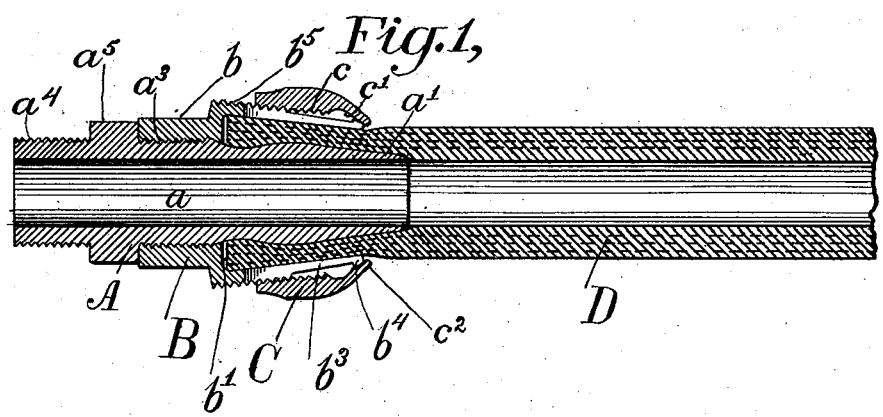
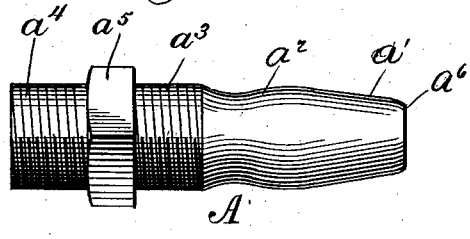 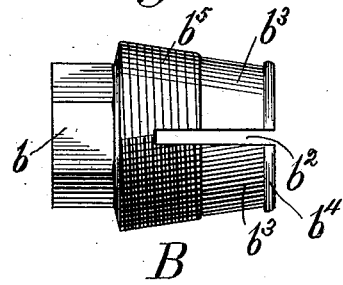 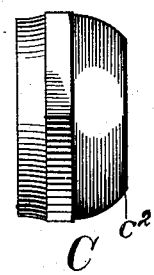
WITNESSES:
M. M. Conover.
INVENTOR
George S. Lee
BY
Chapin & Raymond
his ATTORNEYS

UNITED STATES PATENT OFFICE.

GEORGE S. LEE, OF HAWTHORNE, NEW JERSEY.

HOSE-PIPE CONNECTION.

SPECIFICATION forming part of Letters Patent No. 713,117, dated November 11, 1902.

Application filed August 10, 1901. Serial No. 71,583. (No model.)

*To all whom it may concern:*

Be it known that I, GEORGE S. LEE, a citizen of the United States of America, and a resident of Hawthorne, in the county of Passaic and State of New Jersey, have invented certain new and useful Improvements in Hose-Pipe Connections, of which the following is a specification, reference being had to the accompanying drawings, forming a part thereof.

My invention relates to hose-pipe connections, and particularly to metallic connections adapted to be secured to a flexible hose-pipe and by which the pipe may be connected to some other device, such as a stand-pipe or a nozzle, &c.

The objects of my invention are to cause the connection to hold more firmly to the hose than the devices for the same purpose heretofore used and to render the device simple and composed of few parts and these parts of such character that they may be made readily.

My invention consists of a nipple which has the function of expanding the end of the hose to which it is applied, a socket or sleeve fitting over the expanded end of the hose, and a compression-ring for forcing the socket or sleeve against the hose end. Means are also provided between the several parts to draw them together. For convenience this means may consist of engaging screw-threads on the several parts.

I will describe a hose-pipe connection embodying my invention and will then point out the novel features in claims.

In the accompanying drawings, Figure 1 is a central longitudinal sectional view of a hose-pipe connection embodying my invention as well as a sectional view of a portion of a hose-pipe. Figs. 2, 3, and 4 are each elevational views of the several parts of the hose-pipe connection.

Similar letters of reference designate corresponding parts in all the figures.

A represents a nipple having a tapered portion adapted to enter the end of a flexible hose or other pipe D and tending to expand same.

B is a socket or shell for receiving the expanded end of the hose-pipe, and C a ring for compressing the socket or shell onto the hose end and thereby clamping the hose end between the socket or shell and the expanding-nipple.

The nipple A is here shown as having a straight bore $a$, the interior diameter of which is the same as the inner diameter of the hose-pipe D. It is provided with two oppositely-inclined or tapered portions $a'$ $a^2$, the former of which forms an expanding cone for expanding the hose, while the latter forms a reëntrant portion or groove of less diameter than the greatest diameter of said expanding-cone, so that the portion of the hose which is adjacent to this portion $a^2$ will be expanded to a less degree than the portion of the hose immediately back of it and so will tend to hold the nipple in place in the hose. The nipple A is further provided with screw-threaded portions $a^3$ and $a^4$, separated by a portion $a^5$, having facets to receive a wrench. The inclined portion $a'$ tapers substantially to a knife-edge $a^6$ at the forward end, so that when the nipple is inserted in the end of the hose it will not present a shouldered portion, such as would be liable to retard the flow of fluid through the hose D and coupling.

The socket or shell B is here shown as having an abutment or flange $b$, interiorly screw-threaded to engage the screw-thread $a^3$ of the nipple and with a socket portion $b'$, which receives the expanded end of the hose D. The interior of the socket portion $b'$ is inclined or tapered in the same general direction as the taper or incline $a'$ of the nipple. As here shown, both surfaces (exterior and interior) are tapered, so that the socket portion $b'$ is in the shape of a hollow truncated cone. The exterior of the socket portion $b'$ is provided with a screw-thread $b^5$, and the said socket portion has longitudinal slots $b^2$ therein, by which the portions between them form spring-tongues $b^3$, which being opposite the hose-expanding portion $a'$ are adapted to press the hose against the same. Each spring-tongue $b^3$ is here shown as provided with an external flange $b^4$, and the said flanges are adapted to be engaged by the compression-ring.

The compression-ring C is provided with an interior screw-thread $c$, which engages with the screw-thread $b^5$ and with an interior tapering or inclined surface $c'$, which coacts with the spring-tongues $b^3$. As here shown, the ring is contracted toward its end $c^2$.

In applying the hose-pipe connection the compression-ring C is first slipped onto the hose. The socket or shell is next fitted over the end of the hose-pipe and the expanding-nipple inserted in the end of the hose to expand the end thereof, the nipple being held in the end of the hose by its screw-thread $a^3$ engaging with the interior screw-thread of the flange $b$. The compression-ring is then screwed onto the socket or shell, and in so doing its interior taper $c$ compresses the spring portions onto the hose to firmly clamp the hose between it and the nipple. The compression of the spring portions is increased by reason of the contracted end $c^2$ of the ring working over the flanges $b^4$ of the spring-tongues $b^3$.

It will be seen by reference to Fig. 1 that by reason of the oppositely-inclined or tapered portions of the nipple A the wall of the hose at or near its end will be so compressed as to have a varying thickness and that therefore when the spring portions are compressed against the hose the wall of the hose will be tightly clamped between the inclined surfaces of the nipple and socket or shell. A nozzle or other device may be engaged with the screw-thread $a^4$.

I do not wish to be limited only to the precise form or construction herein set forth, as the same may obviously be varied within wide limits without departing from the spirit and scope of my invention.

What I claim is—

1. In a hose-pipe connection, the combination with a nipple adapted for insertion into a hose, having a forwardly-tapered hose-expanding portion and having a reëntrant portion or groove at the rear of said tapered portion, of a socket fitting over said nipple and having spring-tongues opposite said tapered hose-expanding portion, said nipple and socket being provided with means for drawing the socket longitudinally along the nipple, whereby the spring-tongues are caused to press the hose against said hose-expanding portion.

2. In a hose-pipe connection, the combination with a nipple adapted for insertion into a hose, having a hose-expanding portion tapered substantially to an edge, and having a reëntrant portion or groove at the rear of said tapered portion, of a socket fitting over said nipple and having spring-tongues opposite said tapered hose-expanding portion, said nipple and socket being provided with means for drawing the socket longitudinally along the nipple, whereby the spring-tongues are caused to press the hose against said hose-expanding portion.

3. In a hose-pipe connection, the combination with a nipple adapted for insertion into a hose, having a forwardly-tapered hose-expanding portion and having a reëntrant portion or groove at the rear of said tapered portion, of a socket fitting over said nipple and having spring-tongues opposite said tapered hose-expanding portion, said nipple and socket being provided with means for drawing the socket longitudinally along the nipple, and a compression device for pressing said tongues against the hose.

4. In a hose-pipe connection, the combination with a nipple adapted for insertion into a hose, having a hose-expanding portion tapered substantially to an edge, and having a reëntrant portion or groove at the rear of said tapered portion, of a socket fitting over said nipple and having spring-tongues opposite said tapered hose-expanding portion, said nipple and socket being provided with means for drawing the socket longitudinally along the nipple, and a compression device for pressing said tongues against the hose.

5. In a hose-pipe connection, the combination with a nipple adapted for insertion into a hose, having a forwardly-tapered hose-expanding portion and having a reëntrant portion or groove at the rear of said tapered portion, of a socket fitting over said nipple and having spring-tongues opposite said tapered hose-expanding portion, said nipple and socket being provided with means for drawing the socket longitudinally along the nipple, and a compression-ring threaded on the socket, but projecting forwardly beyond the ends of said tongues, and provided at its front end with a contact portion adapted to press upon the spring-tongues and press the same against the hose as said compression-ring is screwed backward upon the socket.

GEORGE S. LEE.

Witnesses:
A. J. SANGSTER,
W. B. CONGER.